United States Patent Office 3,127,406
Patented Mar. 31, 1964

3,127,406
NOVEL STEROIDAL HYDROXAMIC ACID DERIVATIVES AND PROCESSES FOR THEIR MANUFACTURE
Eugene P. Oliveto, Glen Ridge, N.J., assignor to Schering Corporation, Bloomfield, N.J., a corporation of New Jersey
No Drawing. Filed Nov. 25, 1960, Ser. No. 71,458
25 Claims. (Cl. 260—287)

This invention relates to novel steroids having a six-membered heterocyclic D-ring, to the process for their manufacture, and to the novel intermediates produced thereby. In general, this invention relates to therapeutically active steroidal derivatives possessing a nitrogen-containing six-membered D-ring, and to 17-nitrite steroidal intermediates used in their preparation. More specifically, this invention is concerned with derivatives of the estrane and androstane series having a six-membered D-ring wherein a nitrogen atom is positioned between the original nuclear 13- and 17-carbon atoms, and includes the method of their manufacture and novel 16-desoxy-17-nitrite androstane and estrane intermediates useful in their manufacture.

Included in this invention are 17a-aza-D-homo steroids of the androstane and estrane series of Formulae I, II and III, which compounds are of the general class termed hydroxamic acids since they possess the radical,

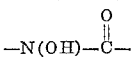

or are ester or ether derivatives thereof:

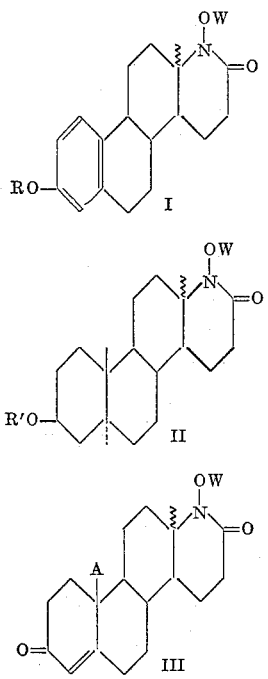

wherein A is a member of the group consisting of H and methyl; R is a member of the group consisting of H, lower alkyl, and an acyl radical of a carboxylic acid having up to eight carbon atoms; R' is a member of the group consisting of H and an acyl radical of a carboxylic acid having up to eight carbon atoms; and W is a member of the group consisting of H, lower alkyl, and an acyl radical of an acid of the group consisting of carboxylic acids having up to eight carbon atoms and sulfonic acids.

The bond linking the nuclear 13-carbon with the angular 19-carbon is designated by the wavy line (∫) to indicate that both the 13α-methyl and 13β-methyl isomers are encompassed by this invention. In this application, therefore, a compound named in the plural, such as 17a-aza-D-homo-5α-androstane-3α,17a-diol-17-ones, indicates that both the 13α-methyl and 13β-methyl isomers are included. A compound named in the singular with no special designation for the C–13 configuration, e.g. 17a-aza-D-homo-5α-androstane-3α,17a-diol-17-one is understood to be the 13β-methyl isomer, whereas a 13-iso-steroid, e.g. 17a-aza-D-homo-5α-13-isoandrostane-3α,17a-diol-17-one, is one possessing the 13α-methyl configuration.

By lower alkyl is contemplated hydrocarbons having preferably up to four carbon atoms and include groups such as methyl, ethyl, n-propyl, isopropyl, n-butyl, isobutyl and t-butyl.

Illustrative of the acyloxy radicals contemplated are lower alkanoates such as acetate, propionate, butyrate, valerate, caproate and t-butylacetate; aroyl esters such as benzoate and toluate; esters from dibasic organic acids such as succinate, phthalate and sulfobenzoate. Also included in the term acyloxy radicals are the alkali metal salts of the dibasic carboxylic acid esters such as for example the 3-sodium hemisuccinate of 17a-aza-D-homo-13-iso-1,3,5(10)-estratriene-3,17a-diol-17-one. Among the sulfonic acids which form 17a-esters are p-toluenesulfonic acid and methanesulfonic acid.

Among the hydroxamic acid derivatives of Formulae I, II and III which are therapeutically active as described hereinbelow are 17a-aza-estratrienes such as 17a-aza-D-homo-13-iso-1,3,5(10)-estratriene-3,17a-diol-17-one, the 3-acetate and 3-benzoate esters thereof, and its diesters which include the 3,17a-diacetate and the 3-acetate 17a-benzoate; 17a-aza-D-homo-13-iso-1,3,5(10)-estratriene-3,17a-diol-17-one 3-methylether, its esters such as the 17a-p-toluenesulfonate, 17a-benzoate, and 17a-acetate, and 17a-ethers, for example, 17a-aza-D-homo-13-iso-1,3,5(10)-estratriene-3,17a-diol-17-one dimethylether and the corresponding 13β-methyl isomers of the aforementioned estratrienes. Other valuable derivatives are 17a-aza-androstanes such as 17a-aza-D-homo-5α-androstane-3α-17a-diol-17-one, the 3-acetate, 3,17a-diacetate and 3-acetate 17a-p-toluenesulfonate esters thereof, and the 17a-lower alkyl ethers thereof, for example, the methyl ether; and 17a-aza-3-keto-4-androstenes such as 17a-aza-D-homo-4-androstene-17a-ol-3,17-dione, the 17a-methylether derivatives thereof, and the 17a-acetate and 17a-p-toluenesulfonate esters; and 17a-aza-D-homo-19-nor-4-androstene-17a-ol-3,17-dione, and the corresponding 13α-isomers of the aforementioned androstanes.

The hydroxamic acids of my invention are conveniently prepared according to my process by first preparing a 17-nitrite ester of a 17-hydroxylated steroid of the estrane or androstane series possessing non-oxygenated carbon atoms adjacent to the 17-hydroxylated carbon, and then subjecting the 16-desoxy-17-nitrite ester to ultra-violet radiation which possesses a band of radiation corresponding to at least some of the absorption bands of the nitrite radical.

The 16-desoxy-17-nitrite estrane or androstane ester intermediates of my process are prepared by reacting a solution of the corresponding 16-desoxy-17-hydroxy steroid in pyridine, dimethylformamide, ethyl acetate, or other non-polar solvent with a nitrosyl halide, preferably nitrosyl chloride. The nitrosyl chloride or bromide used may be added to the 17-hydroxy steroid solution in the same solvent as that used to dissolve the 17-hydroxy steroid, or alternatively, it may be introduced as a gas into the alcohol solution. The formation of the 17-nitrite ester is usually rapid and the progress of the reaction may be followed by a change in the color of the solution so that when the blue-green or other color of the nitrosyl chloride is no longer discharged or changed by reaction with the dissolved 17-hydroxy steroid it can be assumed that the 17-nitrite has formed and the compound in solution is ready for separation and photolysis. The temperature at which the nitrite formation reactions are carried out range from usually −30° to +30° C. In general, when nitrosyl chloride is the reactant used, the reaction temperature is usually in the neighborhood from 0° C. to 30° C., and preferably at 15° C. to 20° C.

After completion of the formation of the 17-nitrite ester, the nitrite is separated usually by adding water to the solution to precipitate the nitrite and by subsequent filtering followed by crystallization and recrystallization, if desired.

Among the 16-non-oxygenated 17-hydroxylated steroids which can be usefully employed as starting materials in the process of the present invention are androstanes such as 5α-androstane - 3α,17β - diol - 3 - acetate, 4 - androstene - 17β - ol - 3 - one (testosterone), and 19 - nor - 4 - androstene - 17β - ol - 3 - one (19 - nortestosterone), and estranes such as 1,3,5(10)-estratriene-3,17β-diol 3-benzoate (estradiol benzoate), 3-methoxy-1,3,5(10) - estratriene - 17β - ol and 3 - acetoxy - 1,3,5(10)-estratriene-17β-ol.

When preparing the novel 17-nitrites, it is preferable to protect any free hydroxyl groups elsewhere in the molecule. Thus, prior to reaction with nitrosyl chloride and subsequent irradiation, the 3-mono esters of estradiol and 5α-androstane-3α,17β-diol, e.g. the benzoate or acetate, are prepared by standard methods such as the catalytic hydrogenation of the 17-ketone group in the corresponding 3-esters of estrone, or of 5α-androstane-3α-ol-17-one.

The novel 17-nitrite estrane and 17-nitrite androstane esters are necessary intermediates for the photolysis process of this invention, and are included within my inventive concept. In addition to being valuable intermediates, the 16-desoxy-17-nitrite esters are also therapeutically active. For example, estradiol 17β-nitrite, the 3-ester and 3-ether derivatives thereof possess estrogenic and cholesterol lowering properties, whereas the androstane-17-nitrites possess androgenic activity, 5α-androstane-3α,17β-diol 17-nitrite and the 3-esters thereof possessing moderate androgenic properties with 4-androstene-17β-ol-3-one 17-nitrite being a potent androgen.

The 16-non-oxygenated-17-nitrite estrane and androstane esters, after preparation and isolation as described above, are dissolved in a non-reactive solvent prior to being irradiated by ultra-violet light according to my process. The solvent chosen preferably has a high degree of transparency to the ultra-violet radiation within the specified band of nitrite absorption. Solvents which may be used for the photolysis of the nitrite include acetic acid, acetone, acetonitrile, benzene, carbon disulfide, carbon tetrachloride, chlorobenzene, chloroform, cyclohexane, dimethylether, dimethylformamide, dioxane, ethyl acetate, Freon 113, heptane, methanol, ethanol, methylene chloride, and toluene. Of these, benzene and toluene yield preferred results.

While the solvents used in the photolysis are ordinarily water-free, a small amount of moisture in the solvent used for photolysis does not ordinarily interfere with the progress of the ultra-violet activation and rearrangement of the nitrite in accordance with the present invention.

The ultra-violet radiation used to activate the nitrite radical so as to cause it to be transferred in part to the C–13 carbon adjacent to the carbon bearing the nitrite group, with concomitant splitting of the D-ring between C–13 and C–17, is that band of radiant energy which corresponds to some or all of the ultra-violet absorption of the nitrite radical, and is from 3000 A. to 4400 A. This energy is conveniently supplied by a Hanovia high pressure mercury arc lamp with a Pyrex sleeve, while the nitrite to be reacted is contained in an ultra-violet transmitting vessel such as a water cooled Vycor-immersion well.

During the course of the photolysis of a 17-nitrite ester of an estrane or androstane, a stream of nitrogen or other inert gas is generally bubbled through the solution (although not always necessary) to keep the nitrite solution protected by an inert atmosphere.

The photolysis of the nitrite ester which is carried on by irradiation with the selected band of ultra-violet radiation is monitored from time to time by infrared spectrophotometry of an aliquot, and the reaction is complete when the infrared absorption spectra lack the characteristic spectra of the nitrite radical.

My process whereby a steroidal 16-desoxy-17-nitrite estrane or androstane is irradiated by ultra-violet light is usually carried out utilizing a 200 watt mercury lamp as an ultra-violet light source with the irradiated material being dissolved in benzene and kept under an atmosphere of nitrogen. The reaction is usually carried out at temperatures ranging from 10–50° C. and preferably in the range of 18–40° C.

By my process of photolyzing a 17-nitrite ester of an androstane or estrane, there is obtained a mixture of isomeric 13α-methyl and 13β-methylhydroxamic acids. These mixtures are separable by partition chromatographic techniques or, advantageously, by fractional crystallization. Of the hydroxamic acids of general Formulae II and III obtained by photolyzing 17-nitrite esters of 17-hydroxylated androstanes (including 17-hydroxylated-19-norandrostanes), the 13β-methyl isomers are usually the least soluble in organic crystallizing solvents such as acetone, ethyl acetate, and the like. Thus, when fractionally crystallizing an isomeric mixture of a 17a - aza - D - homoandrostane or a 17a - aza - D - homo - 19-norandrostane, the 13β-methyl isomer usually predominates in the first crystalline fractions, with the corresponding 13α-methyl isomer, i.e. the 17a-aza-D-homo-13 - isoandrostanes or 17a - aza - D - homo - 13 - iso - 19-norandrostanes remaining in the filtrate. On the other hand, in an isomeric mixture of a hydroxamic acid of general Formula I, obtained as described herein from 17-nitrite esters of 17-hydroxyestranes, the 13α-methyl isomers, i.e. the 17a-aza-D-homo-13-isoestranes, are usually the least soluble in organic solvents and thus predominate in early crystallizing fractions, the corresponding 13β-methyl isomers remaining in solution.

By my process, as described hereinabove, a compound such as estradiol 3-benzoate is first reacted with nitrosyl chloride in pyridine to yield estradiol 3-benzoate 17-nitrite which, upon irradiation by a 200 watt mercury lamp while in a benzene solution and under an atmosphere of nitrogen, yields a mixture of the C–13 isomeric 17a-aza-D-homohydroxamic acids of Formula I, 17a-aza - D - homo - 13 - iso - 1,3,5(10) - estratriene - 3,17a-diol-17-one 3-benzoate and 17a-aza-D-homo-1,3,5(10)-estratriene-3,17a-diol-17-one 3-benzoate which are separable by fractional crystallization from acetone, the 13-iso-17a-aza-D-homoestratriene isomer being the first to come out of solution.

Other 16-desoxy-17-nitrite esters convertible to 17a-aza-D-homo steroids by my process are androstanes such as 5α-androstane-3α,17β-diol 3-acetate 17-nitrite, testosterone nitrite, 19-nortestosterone nitrite; and estranes such as estradiol 3-benzoate 17-nitrite, estradiol 3-acetate 17-nitrite, and estradiol 3-methylether 17-nitrite which, upon ultra-violet light irradiation yield, respectively, 17a-aza-D-homo-5α-androstane - 3α,17a-diol-17-one 3-acetate, 17a-aza-D-homo-4-androstene-17a-ol-3,17-dione, 17a-aza-D-homo-19-nor-4-androstene-17a-ol-3,17-dione, 17a-aza-D-homo-1,3,5(10)-estratriene - 3,17a-diol-17-one 3-benzoate, 17a-aza-D-homo-1,3,5(10)-estratriene - 3,17a-diol-17-one 3-acetate, and 17a-aza-D-homo-1,3,5(10)estratriene-3,17a-diol-17-one 3-methylether and their respective 13α-methyl isomers.

While most of the 17-nitrite esters described herein are in a β-position, the 17α-nitrite esters of 16-non-oxygenated estranes and androstanes are also convertible by my process to the hydroxamic acids of Formulae I, II and III. Thus, for example, when either 1,3,5(10)-estratriene-3,17α-diol-3-methylether 17-nitrite or the 17β-isomer thereof, estradiol 3-methylether 17-nitrite, is irradiated with ultra-violet light, there is obtained the same product, i.e. a mixture of 17a-aza-D-homo-13-iso-1,3,5(10)-estratriene-3,17a-diol-17-one 3-methylether and 17a-aza-D-homo-1,3,5(10)-estratriene-3,17a-diol-17 - one 3 - methylether.

The 17a-esters and 17a-ethers of general Formulae I, II and III are obtained from the corresponding hydroxamic acids by conventional techniques such as, when a 17a-ester is desired, that utilizing acid anhydrides in pyridine or when preparing a 17a-alkyl ether, that utilizing diazomethane or diazoethane in ether or an alkyl halide in alkaline ethanol. Thus, 17a - aza - D-homo-5α-androstane-3α,17β-diol diacetate is prepared from the corresponding 3α-monoacetate ester by reaction with acetic anhydride in pyridine. Additionally, 17a-aza-D-homo-4-androstene-17a-ol-3,17-dione 17a-methylether is obtained by reacting the corresponding 17a-hydroxy compound with excess diazomethane in ether.

An alternate method of preparing a 17a-aza-D-homo-1,3,5(10-estratriene of general Formula I is by dehydrogenation of a corresponding 17a-aza-D-homo-19-nor-4-androstene-3-one of Formula III either by microbiological techniques such as *Corynebacterium simplex* utilizing the process described in U.S. Patent No. 2,837,464, or by chemical methods such as that utilizing selenium dioxide in dioxane.

Thus, according to my invention, a hydroxamic acid of Formula I such as 17a-aza-D-homo-1,3,5(10)-estratriene-3,17a-diol-17-one is obtained by photolyzing 1,3,5(10)-estratriene-3,17β-diol 3-acetate 17-nitrite followed by separation of the 13-methyl isomeric hydroxamic acid mixture thereby formed via, for example, fractional crystallization from acetone-hexane. The 13β-methyl isomer, i.e. 17a-aza-D-homo-1,3,5(10)-estratriene - 3,17a-diol-17-one 3-acetate is first recovered from the filtrate of the corresponding 13-iso estratriene 3-acetate isomer, followed by hydrolysis with, for example, 5% methanolic potassium hydroxide to give 17a-aza-D-homo-1,3,5(10)-estratriene-3,17a-diol-17-one. Alternatively, microbiological dehydrogenation of 17a-aza-D-homo-19-nor-4-androstene-17a-ol-3,17-dione with *Corynebacterium simplex* yields directly the desired 17a-aza-D-homo-1,3,5(10)-estratriene-3,17a-diol-17-one.

In a similar manner, a 13-iso isomer such as 17a-aza-D-homo-13-iso-19-nor-4-androstene-17a-ol-3,17 - dione 17a-acetate is dehydrogenated with *Corynebacterium simplex* to yield the 13-iso estratriene, 17a-aza-D-homo-13-iso-1,3,5(10)-estratriene-3,17a-diol-17-one 17a-acetate.

It is to be understood that the foregoing general description is given as being exemplary of the invention but is not to be construed as restrictive thereof.

Other androstanes which may utilize my novel process for conversion to hydroxamic acids similar to those of Formula III, are those which at position 6 are substituted with a halogen or alkyl group; and/or having at positions 9 and 11 a double bond or a 9α-halogen-11β-hydroxyl or a 9-hydrogen-11β-hydroxyl, or a 9α-halogen-11-keto or a 9-hydrogen-11-keto group; and/or at position 16 there may be a methyl, halogen, or gem-difluoro group. Additionally, in the hydroxamic acids of Formula III, there may be a double bond between positions 1 and 2.

Similarly, other estratrienes suitable for conversion to hydroxamic acids of Formula II are those having an additional double bond between C-9 and C-11, and those possessing a β-hydroxy or 11-keto group at C-11 and/or at C-16, a halogeno, an alkyl (e.g. methyl) or a 16,16-gem-difluoro moiety.

The novel hydroxamic acids of Formulae I, II and III are valuable therapeutic agents.

The 17a-aza-estratrienes of Formula I are useful, therapeutically active compounds in that they exhibit a low estrogenic activity in conjunction with a strong lipid-shifting effect (i.e. these compounds cause a reduction in the serum phospholipids as well as a lowering of the serum cholesterol as tested in the male rat). This combination of low estrogenic and high lipid-shifting properties renders the novel estratrienes of Formula I valuble in the treatment and prevention of conditions which are caused by abnormal cholesterol metabolism and deposition. The 17a-aza-estratrienes possessing a 17a-hydroxy group are preferred as a therapeutic agent over the other estratrienes of Formula I when treating degenerate diseases such as atherosclerosis.

The 17a-aza-androstanes and the 17a - aza - 4-androstenes of Formulae II and III, respectively are valuable therapeutically in that they possess androgenic activity. They are thus valuable in alleviating disorders such as male hypogonadism and male climacteric and, in the female, for ailments such as dysmenorrhea, premenstrual tension and suppression of lactation. The compounds of this invention are formulated for administration in preparations similar to those used in other known androgenic agents such as testosterone, the concentration and/or dosage used being based on the activity of the particular compound.

Additionally, the 5α-androstane derivatives of Formula II are therapeutically valuable in that they cause a reduction in serum cholesterol. This property renders these compounds valuable in the treatment and prevention of diseases accompanied by an increase in serum cholesterol, particularly, for example, in the treatment of atherosclerosis.

In addition to being therapeutically active per se, the 13α- and 13β-methyl isomers of Formulae I, II and III are useful as intermediates in the preparation of the corresponding lactams (i.e. the 17a-aza-17-hydrogen derivatives) by reduction with, for example, zinc in refluxing acetic acid, or in the case of steroids not containing an A-ring ketone, preferably hydrazine in refluxing ethylene glycol. These lactams thus formed by reduction of the hydroxamic acids I, II and III have the following formulae:

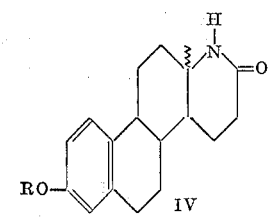

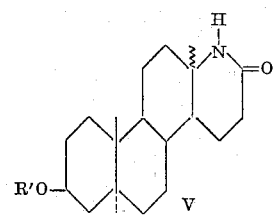

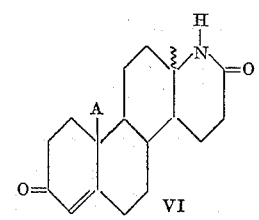

wherein A is hydrogen or methyl; R is hydrogen, lower alkyl or an acyl radical of a carboxylic acid having up to eight carbon atoms; and R' is hydrogen or an acyl radical of a carboxylic acid having up to eight carbon atoms.

The 13-iso lactams of the above formulae are therapeutically valuable compounds. The 13-iso estratriene lactams (IV) such as 17a-aza-D-homo-13-iso-1,3,5(10)-estratriene-3-ol-17-one 3-benzoate, possess estrogenic activity; whereas 13-isoandrostane lactams V and VI such as 17a-aza-D-homo-5α-13-isoandrostane-3α-ol-17-one 3-acetate and 17a-aza-D-homo-13-iso-4-androstene-3,17-dione respectively, possess androgenic activity, the 3-keto-Δ⁴-13-iso lactams of Formula VI advantageously possessing a favorable androgenic/anabolic ratio.

The following are examples which illustrate my invention. They are not to be construed as limiting, however, the scope of my invention being limited by the appended claims only.

EXAMPLE 1

*17a-Aza-D-Homo-5α-Androstane-3α,17a-Diol-17-One 3-Acetate and 17a-Aza-D-Homo-5α-13-Isoandrostane-3α, 17a-Diol-17-One 3-Acetate*

A. 5α-ANDROSTANE-3α,17β-DIOL 3-ACETATE 17-NITRITE

To a stirred solution of 100 mg. of 5α-androstane-3α, 17β-diol 3-acetate in 5 ml. of pyridine at —20° C., there is added dropwise a saturated solution of nitrosyl chloride in pyridine until a permanent blue color is obtained. The solution is stirred for two minutes longer and then diluted with water. A solid separates which is filtered, washed with water, dried in vacuo at room temperature and crystallized from ether-pentane to give 5α-androstane-3α,17β-diol 3-acetate 17-nitrite, M.P. 177–180° C., dec., $[\alpha]_D$ —33°.

B. 17a-AZA-D-HOMO-5α-ANDROSTANE-3α,17a-DIOL-17-ONE 3 ACETATE

A solution of 500 mg. of 5α-androstane-3α,17β-diol 3-acetate 17-nitrite in 170 ml. of benzene at 18° C. under an atmosphere of nitrogen is irradiated for one hour with a 200 watt mercury lamp (Pyrex filter). The solution is then evaporated in vacuo to a residue which is crystallized three times from ether-acetone to give 17a-aza-D-homo-5α-androstane-3α,17a-diol-17-one 3-acetate, M.P. 229–233° C., $[\alpha]_D$ —2°.

C. 17a-AZA-D-HOMO-5α-13-ISOANDROSTANE-3α,17a-DIOL-17-ONE 3-ACETATE

The ether-acetone filtrate from the first crystallization in Example 1B is concentrated to about one-fourth its original volume, then cooled. A solid separates which is filtered and dried to give substantially 17a-aza-D-homo-5α-13-isoandrostane-3α,17a-diol-17-one 3-aceate.

EXAMPLE 2

*17a-Aza-D-Homo-4-Androstene-17a-Ol-3,17-Dione and 17a-Aza-D-Homo-13-Iso-4-Androstene-17a-Ol-3,17-Dione*

A. 4 ANDROSTENE-17β-OL-3-ONE 17-NITRITE

To a solution of 8.35 g. of 4-androstene-17β-ol-3-one in 120 ml. of pyridine, cooled to —20° C. is added dropwise a saturated solution of nitrosyl chloride in pyridine until a permanent blue color is obtained. The solution is then diluted with water. A solid separates which is filtered and dried in vacuo to give 4-androstene-17β-ol-3-one 17-nitrite, M.P. c.a. 100° C., dec., $[\alpha]_D$ +63°.

B. 17a-AZA-D-HOMO-4-ANDROSTENE-17a-OL-3,17-DIONE

A solution of 13.8 g. of 4-androstene-17β-ol-3-one 17-nitrite in 1800 ml. of benzene at 18° C. under an atmosphere of nitrogen is irradiated for 1½ hours with a 200 watt mercury lamp (Pyrex filter). The solution is then evaporated in vacuo to a residue which is dissolved in about 800 ml. of acetone. The acetone solution is warmed and treated with decolorizing charcoal and filtered. The filtrate is concentrated until a solid begins to separate. The solution is cooled, the resultant precipitate filtered and the filtrate set aside. The precipitate is then recrystallized twice more from acetone to give 17a-aza-D-homo-4-androstene-17a-ol-3,17-dione, M.P. 222–223° C., $[\alpha]_D$ +67°.

C. 17a-AZA-D-HOMO-13-ISO-4-ANDROSTENE-17a-OL-3,17-DIONE

The original acetone filtrate which was set aside in Example 2C is concentrated to one-fourth its original volume and cooled. A solid separates which is filtered and dried to give substantially 17a-aza-D-homo-13-iso-4-androstene-17a-ol-3,17-dione.

EXAMPLE 3

*17a-Aza-D-Homo-19-Nor-4-Androstene-17a-Ol-3,17-Dione and 17a-Aza-D-Homo-13-Iso-19-Nor-4-Androstene-17a-Ol-3,17-Dione*

A. 19-NOR-4-ANDROSTENE-17β-OL-3-ONE 17-NITRITE

A solution of 8 g. of 19-nor-4-androstene-17β-ol-3-one in 120 ml. of pyridine is reacted with a saturated solution of nitrosyl chloride in pyridine in the manner of Example 2A. The resultant product is isolated as described to give 19-nor-4-androstene-17β-ol-3-one 17-nitrite, M.P. 84–87° C., $[\alpha]_D$ +9°.

B. 17a-AZA-D-HOMO-19-NOR-4-ANDROSTENE-17a-OL-3,17-DIONE 19-nor-4-androstene-17β-ol-3-one 17-nitrite in benzene is irradiated with a 200 watt mercury lamp (Pyrex filter) in the manner of Example 2B. The resultant product is dissolved in acetone and separated into an acetone soluble and acetone insoluble fraction as described. The acetone insoluble fraction is recrystallized twice more from acetone to give 17a-aza-D-homo-19-nor-4-androstene-17a-ol-3,17-dione, M.P. 227–235° C., $[\alpha]_D$ +21°.

C. 17a-AZA-D-HOMO-13-ISO-19-NOR-4-ANDROSTENE-17a-OL-3,17-DIONE

The acetone soluble fraction of Example 3B is concentrated to a residue yielding 17a-aza-D-homo-13-iso-19-nor-4-androstene-17a-ol-3,17-dione.

EXAMPLE 4

*17a-Aza-D-Homo-5α-Androstane-3α,17a-Diol-17-One 3,17a-Diacetate*

A. To 90 mg. of 17a-aza-D-homo-5α-androstane-3α, 17a-diol-17-one 3-acetate (the compound of Example 1B) is added 3 ml. of pyridine and 0.5 ml. of acetic anhydride. The mixture is left at room temperature for 18 hours. Water is then added. A solid separates which is filtered, dried at room temperature and crystallized from acetone-hexane to give 17a-aza-D-homo-5α-androstane-3α,17a-diol-17-one 3,17a-diacetate, M.P. 173°–176° C., $[\alpha]_D$ +16°

B. Alternatively, the compound of this example is prepared by dissolving 1 g. of 17a-aza-D-homo-5α-androstane-3α,17a-diol-17-one 3-acetate in 10 ml. of glacial acetic acid to which is added 10 mg. of p-toluenesulfonic acid. The solution is stirred for 24 hours then water added. A solid separates which is filtered, dried at room temperature and crystallized from acetone-hexane to give 17a-aza-D-homo-5α-androstane-3α,17a-diol-17-one 3,17a-diacetate.

In a manner similar to Example 4B, 17a-aza-D-homo-5α-13-isoandrostane-3α,17a-diol-17-one 3-acetate is reacted with pyridine and acetic anhydride to give 17a-aza-D-homo-5α-13-isoandrostane-3α,17a-diol-17-one diacetate.

EXAMPLE 5

*17a-Aza-D-Homo-4-Androstene-17a-Ol-3,17-Dione 17-Acetate and the 19-Nor Analog Thereof*

To 300 mg. of 17a-aza-D-homo-4-androstene-17a-ol-3,17-dione (the compound of Example 2B) is added 2 ml. of acetic anhydride and 10 ml. of pyridine. The reaction mixture is left at room temperature for 22 hours, then water is added. A precipitate results which is filtered, washed with water, dried at room temperature and crystallized from acetone-isopropylether to give 17a-aza-D-homo-4-androstene-17a-ol-3,17-dione 17a-acetate, M.P. 165°–167° C., [α]$_D$ +80°.

In a similar manner, 300 mg. of 17a-aza-D-homo-19-nor-4-androstene-17a-ol-3,17-dione (the compound of Example 3B) is reacted with acetic anhydride and pyridine and the resultant product isolated and purified to give 17a-aza-D-homo-19-nor-4-androstene-17a-ol-3,17-dione 17a-acetate, M.P. 185°–188° C., [α]$_D$ +39°.

Other 17a-esters of 17a-aza-D-homo-4-androstene-17a-ol-3,17-dione and 17a-aza-D-homo-19-nor-4-androstene-17-ol-3,17-dione are prepared according to the above procedure by substituting for acetic anhydride the anhydride of other acids such as propionic, valeric or benzoylchloride to obtain their corresponding 17a-esters, i.e. the 17a-propionate, 17a-valerate and 17a-benzoate, respectively of 17a-aza-D-homo-4-androstene-17a-ol-3,17-dione and 17a-aza-D-homo-19-nor-4-androstene-17-ol-3,17-dione.

The 13α-methyl isomers of the compounds of this example are similarly prepared by reaction of acetic anhydride and pyridine on 17a-aza-D-homo-13-iso-4-androstene-17a-ol-3,17-dione or 17a-aza-D-homo-13-iso-19-nor-4-androstene-17a-ol-3,17-dione to yield respectively 17a-aza-D-homo-13-iso-4-androstene-17a-ol-3,17-dione 17a-acetate and 17a-aza-D-homo-13-iso-19-nor-4-androstene-17a-ol-3,17-dione 17a-acetate.

EXAMPLE 6

*17a-Aza-D-Homo-5α-Androstane-3α,17a-Diol-17-One*

A solution of 200 mg. of 17a-aza-D-homo-5α-androstane-3α,17a-diol-17-one 3-acetate (the compound of Example 1B) in 30 ml. of 5% methanolic potassium hydroxide is refluxed for one hour. The solution is cooled and brought to neutrality with 2 N-hydrochloric acid and evaporated in vacuo to a residue having a volume of about 2 ml. The residue is triturated with water, filtered and dried in vacuo at 60° C. and crystallized from acetone-hexane to give 17a-aza-D-homo-5α-androstane-3α,17a-diol-17-one.

In a similar manner, 17a-aza-D-homo-5α-13-isoandrostane-3α,17a-diol-17-one 3-acetate (the compound of Example 1C) is reacted with methanolic potassium hydroxide to give 17a-aza-D-homo-5α-13-isoandrostane-3α,17a-diol-17-one.

EXAMPLE 7

*17a-Aza-D-Homo-5α-Androstane-3α,17a-Diol-17-One 17a-Acetate*

320 mg. of 17a-aza-D-homo-5α-androstane-3α,17a-diol-17-one is dissolved in 20 ml. of pyridine and 0.11 ml. of acetic anhydride. The solution is kept at room temperature for 18 hours and then poured into water. A solid separates which is filtered, washed with water, dried and crystallized from acetone-hexane to give 17a-aza-D-homo-5α-androstane-3α,17a-diol-17-one 17a-acetate.

Similarly, 17a-aza-D-homo-5α-13-isoandrostane-3α,17a-diol-17-one is reacted with pyridine and acetic anhydride as hereinabove described to give 17a-aza-D-homo-5α-13-isoandrostane-3α,17a-diol-17-one 17a-acetate.

EXAMPLE 8

*The 17a-Methylethers of 17a-Aza-D-Homoandrostanes*

To a stirred solution of 1 g. of 17a-aza-D-homo-5α-androstane-3α,17a-diol 3-acetate (the compound of Example 1B) in 100 ml. of ether is added a large molar excess of ethereal diazomethane, followed by 0.1 ml. of boron trifluoride etherate. The solution is allowed to stand for 18 hours at room temperature and is then concentrated in vacuo to a residue which is crystallized from acetone-hexane to give 17a-aza-D-homo-5α-androstane-3α,17a-diol 3-acetate 17a-methylether.

Similarly, 17a-aza-D-homo-5α-13-isoandrostane-3α,17a-diol 3-acetate (the compound of Example 1C), 17a-aza-D-homo-4-androstene-17a-ol-3,17-dione (the compound of Example 2B), 17a-aza-D-homo-19-nor-4-androstene-17a-ol-3,17-dione (the compound of Example 3B) and the 13α-methyl isomers of Examples 2C and 3C are each reacted with diazomethane in the above manner to give respectively, 17a-aza-D-homo-5α-13-isoandrostane-3α,17a-diol 3-acetate 17a-methylether, 17a-aza-D-homo-4-androstene-17a-ol-3,17-dione 17a-methylether, 17a-aza-D-homo-19-nor-4-androstene-17a-ol-3,17-dione 17a-methylether, 17a-aza-D-homo-13-iso-4-androstene-17a-ol-3,17-dione 17a-methylether, and 17a-aza-D-homo-13-iso-19-nor-4-androstene-17a-ol-3,17-dione 17a-methylether.

EXAMPLE 9

*17a-Aza-D-Homo-4-Androstene-17a-Ol-3,17-Dione 17a-Ethylether*

One gram of 17a-aza-D-homo-4-androstene-17a-ol-3,17-dione (the compound of Example 2B) is dissolved in 100 ml. of ether and then there is added a large molar excess of ethereal diazoethane followed by 0.1 ml. of boron trifluoride etherate. The solution is allowed to stand for 20 hours at room temperature and is then concentrated in vacuo to a residue which is crystallized from acetone-hexane to give 17a-aza-D-homo-4-androstene-17a-ol-3,17-dione 17a-ethylether.

In a similar manner, 17a-aza-D-homo-13-iso-4-androstene-17a-ol-3,17-dione (the compound of Example 2C) is reacted with diazoethane to give 17a-aza-D-homo-13-iso-4-androstene-17a-ol-3,17-dione 17a-ethylether.

EXAMPLE 10

*17a - Aza - D - Homo - 13 - Iso - 1,3,5(10) - Estratriene-3,17a - Diol - 17 - One - 3 - Benzoate and 17a - Aza-D - Homo - 1,3,5(10) - Estratriene - 3,17a - Diol - 17-One 3-Benzoate*

A. 1,3,5(10)-ESTRATRIENE-3,17β-DIOL 3-BENZOATE 17-NITRITE

A solution of 7.15 g. of 1,3,5(10)-estratriene-3,17β-diol 3-benzoate in 153 ml. of pyridine is cooled to −20° C. To this stirred cold solution is added a saturated solution of nitrocyl chloride in pyridine until a permanent blue color is obtained. The reaction mixture is then diluted with water. A solid separates which is filtered, washed with water and dried in vacuo to give 1,3,5(10)-estratriene-3,17β-diol 3-benzoate 17-nitrite, M.P. 165–167° C., dec., [α]$_D$ +8°.

B. 17a-AZA-D-HOMO-13-ISO-1,3,5(10)-ESTRATRIENE-3,17a-DIOL-17-ONE 3-BENZOATE

A solution of 9.82 g. of 1,3,5(10)-estratriene-3,17β-diol 3-benzoate 17-nitrite in 1500 ml. of benzene is irradiated at 18° C. under an atmosphere of nitrogen for 2¼ hours with a 200 watt mercury lamp (pyrex filter). The reaction mixture is evaporated in vacuo to a residue (identified as R–10–B) which is dissolved in acetone. The acetone solution is warmed, treated with decolorizing charcoal, filtered and concentrated until a solid begins to separate. The acetone solution is cooled, the resultant precipitate filtered, and the filtrate set aside. The solid residue is then recrystallized three times from acetone to give 17a-aza-D-homo-13-iso-1,3,5(10)-estratriene-3,17a-diol-17-one 3-benzoate, M.P. 205–210° C.

C. 17a-AZA-D-HOMO-1,3,5(10)-ESTRATRIENE-3,17a-DIOL-17-ONE 3-BENZOATE

The first acetone filtrate from above Example 10B is concentrated to about one-fourth its original volume, and cooled. A solid separates which is filtered and dried to give 17a-aza-D-homo-1,3,5(10)-estratriene-3,17a-diol-17-one 3-benzoate which when recrystallized twice from methylene chloride-acetone has a M.P. of 227–232° C.

D. Alternatively, the compounds of Examples 10B and 10C are isolated from the mixed isomeric residue R–10–B of Example 10B by the following fractional crystallization technique.

Residue R–10–B is recrystallized three times from methylene chloride-methanol and is then dissolved in acetone. The acetone solution is concentrated until a solid separates, then is cooled and filtered, the filtrate being set aside. The resultant solid residue is recrystallized from methylene chloride-acetone to give 17a-aza-D-homo-1,3,5(10)-estratriene-3,17a-diol-17-one 3-benzoate, M.P. 227–232° C., [α]$_D$ +63°.

The acetone filtrate which had been set aside is concentrated to a residue which is recrystallized from acetone-methanol to give 17a-aza-D-homo-13-iso-1,3,5(10)-estratriene-3,17a-diol-17-one 3-benzoate, M.P. 205–210° C., [α]$_D$ −3°.

In the above alternative method 10D, the 13-iso-estratriene isomer of this example remained in the acetone filtrate of the corresponding 13β-methylestratriene, the reverse order of separation from that described in 10B and 10C. It is thus apparent that the order in which the 13-isomers crystallize from solution can be changed by varying fractional crystallization techniques.

EXAMPLE 11

*1,3,5(10)-Estratriene-3,17β-Diol 3-Methylether 17-Nitrite*

To a stirred solution of 15 g. of estradiol 3-methylether in 100 ml. of pyridine at −25° C. is added dropwise, the saturated solution of nitrosyl chloride in pyridine until a permanent blue color is obtained. The solution is diluted with water. A solid separates which is filtered, washed with water, dried in vacuo at room temperature and crystallized from ether to give 1,3,5(10)-estratriene-3,17β-diol 3-methylether 17-nitrite, M.P. 138–143° C.

EXAMPLE 12

*1,3,5(10)-Estratriene-3,17α-Diol 3-Methylether 17-Nitrite*

Gaseous nitrosyl chloride is passed through a stirred solution of 500 mg. of 1,3,5(10)-estratriene-3,17α-diol 3-methylether in 20 ml. of pyridine at room temperature until a solution is permanently red in color. Stirring is continued for one hour at room temperature, then the reaction mixture is diluted with water and extracted with ether. The ether extracts are combined, washed with water, dried over sodium sulfate and evaporated to a residue essentially of 1,3,5(10)-estratriene-3,17α-diol 3-methylether 17-nitrite. This product is used without further purification in Example 13C.

EXAMPLE 13

*17a - Aza - D - Homo - 13 - Iso - 1,3,5(10) - Estratriene-3,17a - diol - 17 - One 3 - Methylether and 17a-Aza - D - Homo - 1,3,5(10) - Estratriene - 3,17a - Diol-17-One 3-Methylether*

A. 17a-AZA-D-HOMO-13-ISO-1,3,5(10)-ESTRATRIENE-3,17a-DIOL-17-ONE 3-METHYLETHER

A solution of 16 g. of 1,3,5(10)-estratriene-3,17β-diol-3-methylether 17-nitrite (the compound of Example 11) in 1800 ml. of benzene at 18° C. under an atmosphere of nitrogen is irradiated with a 200 watt mercury lamp (pyrex filter) for 2½ hours. The reaction mixture is evaporated in vacuo to a residue which is triturated with ether. A solid separates which is filtered, and crystallized three times from acetone to give 17a-aza-D-homo-13-iso-1,3,5(10)-estratriene-3,17a-diol-17-one 3-methylether, M.P. 205–207° C., [α]$_D$ ±0°.

B. 17a-AZA-D-HOMO-1,3,5(10)-ESTRATRIENE-3,17a-DIOL-17-ONE 3-METHYLETHER

The acetone filtrate from the first crystallization of the compound of Example 10A is concentrated to about one-fourth its original volume and cooled. A solid separates which is recrystallized three times from acetone-ethylacetate to give 17a-aza-D-homo-1,3,5(10)-estratriene-3,17a-diol-17-one 3-methylether.

C. A solution of 510 mg. of 1,3,5(10)-estratriene-3,17α-diol 3-methylether 17-nitrite (the compound of Example 12) in 170 ml. of benzene under an atmosphere of nitrogen is irradiated at 18° C. with a 200 watt mercury lamp (pyrex filter) for one hour. The reaction mixture is evaporated in vacuo to a residue which is triturated with ether and acetone. A solid separates which is filtered and crystallized four times from acetone to give 17a-aza-D-homo-13-iso-1,3,5(10)-estratriene-3,17a-diol - 17 - one 3-methylether. A mixed melt of the compound of this example (13C) with 17a-aza-D-homo-13-iso-1,3-5(10)-estratriene-3,17a-diol-17-one 3-methylether prepared as described in Example 13A, does not depress the melting point.

The acetone filtrate from the first acetone crystallization described in the paragraph immediately above is concentrated to about one-fourth its original volume, then cooled. A solid separates which is filtered and dried to yield 17a-aza-D-homo-1,3,5(10)-estratriene-3,17a-diol-17-one-3-methylether.

EXAMPLE 14

*17a-Esters of 17a-Aza-D-Homo-Estratrienes*

A. 17a-AZA-D-HOMO-13-ISO-1,3,5(10)-ESTRATRIENE 3,17a-DIOL-17-ONE-3-BENZOATE 17a-ACETATE

To 500 mg. of 17a-aza-D-homo-13-iso-1,3,5(10)-estratriene-3,17a-diol-17-one 3-benzoate (the compound of Example 10B) is added 15 ml. of pyridine and 3 ml. of acetic anhydride. The reaction mixture is left at room temperature for 18 hours, then water added. A solid separates which is filtered, dried at room temperature and crystallized from acetone-isopropylether to give 17a-aza-D-homo-13-iso-1,3,5(10)-estratriene-3,17a-diol-17-one 3-benzoate 17a-acetate, M.P. 194–196° C., [α]$_D$ −13°.

B. 17a-AZA-D-HOMO-13-ISO-1,3,5(10)-ESTRATRIENE-3,17a-DIOL-17-ONE 3-METHYLETHER 17a-ACETATE

17a - aza - D - homo-13-iso-1,3,5(10)-estratriene-3,17a-diol-17-one 3-methylether (the compound of Example 13A) is reacted with pyridine and acetic anhydride in the manner of Example 14A. The resultant product is isolated in the described manner and crystallized from acetone to give 17a-aza-D-homo-13-iso-1,3,5(10)-estratriene-3,17a-diol-17-one 3-methylether 17a-acetate, M.P. 198–200° C., [α]$_D$ +14°.

C. In a similar manner, other 17a-lower alkanoic acid esters of 17a-aza-D-homo - 13 - iso-1,3,5(10)-estratriene-3,17a-diol-17-one 3-benzoate and 17a-aza-D-homo-3-iso-1,3,5(10)-estratriene-3,17a-diol-17-one 3-methylether are prepared according to the above procedure 14A, by substituting for acetic anhydride, an anhydride of other lower alkanoic acid anhydrides such as propionic, valeric and caproic whereby are obtained the corresponding esters, i.e. 17a-aza - 4 - homo-13-iso-1,3,5(10)-estratriene-3,17a-diol-17-one 3-benzoate 17a-propionate, 17a-aza-D-homo-13-iso-1,3,5(10)-estratriene-3,17a-diol-17-one 3-benzoate 17a-valerate, 17a-aza - D - homo-13-iso-1,3,5(10)-estratriene-3,17a-diol-17-one 3-benzoate 17a-caproate, and 17a-aza-D-homo-1,3,5(10) - estratriene - 3,17a-diol-17-one 3-methylether 17a-propionate, 17a-aza-D-homo-13-iso-1,3,5(10)-estratriene-3,17a-diol-17-one 3-methylether 17a-valerate, 17a-aza - D - homo-13-iso-1,3,5(10)-estratriene-3,17a-diol-17-one 3-methylether 17a-caproate, respectively.

In addition, by substituting the acid chloride of benzoic acid or p-toluenesulfonic acid for acetic acid in above procedures 14A and 14B, there is obtained 17a-aza-D-homo - 13 - iso - 1,3,5(10) - estratriene-3,17a-diol-17-one 3,17a-dibenzoate, 17a-aza-D-homo-13-iso-1,3,5(10)-estratriene-3,17a-diol-17-one 3-benzoate 17a-p-toluenesulfonate, 17a-aza-D-homo-13-iso-1,3,5(10)-estratriene - 3,17a-diol-17-one 3-methylether 17a-benzoate and 17a-aza-D-homo-13-iso-1,3,5(10)-estratriene-3,17a-diol - 17 - one 3-methylether 17a-p-toluenesulfonate, respectively.

D. 17a-aza-D-homo-1,3,5(10)-estratriene-3,17a-diol-17-one 3-benzoate (the compound of Example 10C) and 17a-aza-D-homo-1,3,5(10) - estratriene-3,17a-diol-17-one 3-methylether (the compound of Example 13B) are each reacted with acetic anhydride in pyridine in the manner of Example 14A to obtain respectively 17a-aza-D-homo-1,3,5(10)-estratriene-3,17a-diol-17-one 3-benzoate 17a- acetate, and 17a-aza-D-homo-1,3,5(10)-estratriene-3,17a-diol-17-one 3-methylether 17a-acetate.

Similarly, the 13β-isomers prepared in Examples 10C and 13B when reacted with benzoyl chloride in pyridine or p-toluenesulfonyl chloride in pyridine in the manner of Example 14C yield respectively, 17a-aza-D-homo-1,3,5(10)-estratriene-3,17a-diol-17-one dibenzoate, 17a-aza-D-homo - 1,3,5(10) - estratriene-3,17a-diol-17-one 3-benzoate 17a-p-toluenesulfonate, 17a-aza-D-homo-1,3,5-(10) - estratriene-3,17a-diol-17-one 3-methylether 17a-benzoate, and 17a-aza-D-homo-1,3,5(10) - estratriene-3,17a-diol-17-one 3-methylether 17a-p-toluenesulfonate.

EXAMPLE 15

*17a-Aza-D-Homo - 13 - Iso - 1,3,5(10)-Estratriene-3,17a-Diol-17-One 3-Acetate and 17a-Aza-D-Homo-1,3,5-(10)-Estratriene-3,17a-Diol-17-One*

A. 1,3,5(10-ESTRATRIENE-3,17β-DIOL 3-ACETATE 17-NITRITE

A stirred solution of 1 g. of 1,3,5(10)-estratriene-3,17β-diol 3-acetate in 50 ml. of pyridine at −20° C. is reacted with nitrosyl chloride in the manner of Example 1A. The resultant product is isolated as described to give 1,3,5(10)-estratriene-3,17β-diol 3-acetate 17-nitrite.

B. 17a-AZA-D-HOMO-13-ISO-1,3,5(10)-ESTRATRIENE-3,17a-DIOL-17-ONE 3-ACETATE

A solution of 1 g. of 1,3,5(10)-estratriene-3,17β-diol 3-acetate 17-nitrite in 100 ml. of benzene is irradiated under an atmosphere of nitrogen for 2 hours at 18° C. with a 200 watt mercury lamp (pyrex filter). The reaction mixture is evaporated in vacuo to a residue which is triturated with ether. A solid separates which is filtered and crystallized three times from acetone-hexane to give 17a-aza-D-homo-13-iso-1,3,5(10) - estratriene-3,17a-diol-17-one 3-acetate, M.P. 187–190° C., $[\alpha]_D +75°$.

C. 17a-AZA-D-HOMO-1,3,5(10)-ESTRATRIENE-3,17a-DIOL-17-ONE 3-ACETATE

The filtrate from the ether trituration and the first acetone-hexane recrystallization of the compound of Example 15B are combined and concentrated. The resultant residue is dissolved in acetone and the acetone solution concentrated to about one-fourth its original volume then cooled. A solid separates which is filtered and dried yielding 17a-aza-D-homo-1,3,5(10)-estratriene-3,17a-diol-17-one 3-acetate.

EXAMPLE 16

*17a-Aza-D-Homo-13-Iso-1,3,5(10)-Estratriene-3,17a-Diol-17-One*

A solution of 300 mg. of 17a-aza-D-homo-13-iso-1,3,5(10)-estratriene-3,17a-diol-17-one 3-acetate (the compound of Example 15B) in 40 ml. of 5% methanolic potassium hydroxide is refluxed for 30 minutes. The solution is then brought to neutrality with 2 N-hydrochloric acid and concentrated in vacuo to a residue of about 3 ml. The residue is triturated with water, filtered, dried and recrystallized from acetone-hexane to give 17a-aza - D - homo-13-iso-1,3,5(10)-estratriene-3,17a-diol-17-one, M.P. 294–298° C.

EXAMPLE 17

*17a-Aza-D-Homo-1,3,5(10)-Estratriene-3,17a-Diol-17-One*

17a-aza - D - homo-1,3,5(10)-estratriene-3,17a-diol-17-one 3-acetate (the compound of Example 15C) is reacted with methanolic potassium hydroxide in the manner of Example 16 to give 17a-aza-D-homo-1,3,5(10)-estratriene-3,17a-diol-17-one.

Alternatively, the compound of this example is prepared as follows.

From a solution of 30 g. of yeast extract (Difco) in 3 l. of tap water containing 13.2 g. of patassium dihydrogen phosphate and 26.4 g. of disodium hydrogen phosphate, 27 portions of 100 ml. each are withdrawn, placed in 300 ml. Erlenmeyer flasks and sterilized by autoclaving for 15 minutes at 15 pound steam pressure (120° C.). After autoclaving and cooling of the broth, 1 ml. of a suspension of *Corynebacterium simplex* (ATCC 6946) is placed in each flask and the flasks are then shaken at 220 r.p.m. and 28° C. for 24 hours.

Into each of the 27 Erlenmeyer flasks are placed 150 mg. of 17a-aza-D-homo-19-nor-4-androstene-17a-ol-3,17-dione (the compound of Example 3B). The flasks and contents are sterilized for 15 minutes at 15 pound steam pressure. To each flask is added 5 ml. of ethanol. The 24 hour bacterial culture is then transferred aseptically and the resulting suspensions shaken at 220 r.p.m. and 28° C. for 48 hours.

The contents of the flasks are then combined and extracted three times with 3 liters of chloroform per extraction. The combined chloroform extracts are evaporated to a residue which is dissolved in acetone. The acetone solution is concentrated to half the original volume then cooled. A solid separates which is filtered and dried to give 17a-aza-D-homo-1,3,5(10)-estratriene-3,17a-diol-17-one.

EXAMPLE 18

*17a-Aza-D-Homo-13-Iso-1,3,5(10)-Estratriene-3,17a-Diol-17-One-3,17a-Diacetate*

A solution of 100 mg. of 17a-aza-D-homo-13-iso-1,3,5(10)-estratriene-3,17a-diol-17-one 3-acetate (the compound of Example 15B) in 10 ml. of pyridine and 1 ml. of acetic anhydride is left at room temperature for 18 hours. The reaction mixture is diluted with water. A solid separates which is filtered, washed with water, dried and crystallized from acetone-hexane to give 17a-aza-D-homo-13-iso-1,3,5(10)-estratriene-3,17a-diol - 17 - one 3,17a-diacetate, M.P. 185–190° C., $[\alpha]_D +51°$.

Alternatively, 100 mg. of 17a-aza-D-homo-13-iso-1,3,5(10)-estratriene-3,17a-diol-17-one (the compound of Example 16) is reacted with pyridine and acetic anhydride to give 17a-aza-D-homo-13-iso-1,3,5(10)-estratriene-3,17a-diol-17-one 3,17a-diacetate.

In a similar manner, 17a-aza-D-homo-1,3,5(10)-estratriene-3,17a-diol-17-one (the compound of Example 17) is reacted with pyridine and acetic anhydride in the above manner to give 17a-aza-D-homo-1,3,5(10)-estratriene-3,17a-diol-17-one 3,17a-diacetate.

EXAMPLE 19

*17a-Aza-D-Homo-13-Iso-1,3,5(10)-Estratriene-3,17a-Diol-17-One-3-Acetate 17a-Benzoate*

A solution of 100 mg. of 17a-aza-D-homo-13-iso-1,3,5(10)-estratriene-3,17a-diol-17-one 3-acetate (the compound of Example 15B) in 10 ml. of pyridine and 1 ml. of benzoyl chloride is kept at room temperature for 24 hours. The reaction mixture is diluted with water. The resultant precipitate is filtered, washed with water, dried and crystallized from acetone-hexane to give 17a-aza - D - homo-13-iso-1,3,5(10)-estratriene-3,17a-diol-17-one 3-acetate 17a-benzoate.

EXAMPLE 20

*17a-Aza-D-Homo-13-Iso-1,3,5(10)-Estratriene-3,17a-Diol-17-One 3-Methylether 17a-p-Toluenesulfonate*

A solution of 1 g. of 17a-aza-D-homo-13-iso-1,3,5(10)-estratriene-3,17a-diol-17-one 3-methylether (the compound of Example 13A) in 10 ml. of pyridine is cooled in an ice-bath. A solution of 700 mg. of p-toluenesulfonyl chloride in 6 ml. of methylene chloride is added and the solution left at 5° C. for 48 hours. The reaction mixture is then diluted with methylene chloride and washed first with hydrochloric acid, then with water, 10% aqueous sodium carbonate and finally with water. The methylene chloride solution is dried over sodium sulfate and evaporated to a residue which is recrystallized from methanol to give 17a-aza-D-homo-1,3,5(10)-estratriene-3,17a-diol-17-one 3-methylether 17a-p-toluenesulfonate, M.P. 177–185° C. dec.

EXAMPLE 21

*17a-Aza-D-Homo-13-Iso-1,3,5(10)-Estratriene-3,17a-Diol-17-One 3-Methylether 17a-Benzoate*

To a solution of 100 mg. of 17a-aza-D-homo-13-iso-1,3,5(10)-estratriene-3,17a-diol-17-one 3-methylether (the compound of Example 13A) in 10 ml. of pyridine is added 1 ml. of benzoyl chloride. The solution is allowed to stand at room temperature for 18 hours and is then poured into water. The aqueous mixture is extracted with ether and the ether extracts combined, washed with water, dried over sodium sulfate and then evaporated to a residue. The residue is chromatographed on Florisil which is eluted with methylene chloride. The methylene chloride eluates are combined and concentrated to a residue which is crystallized from methylene chloride-hexane to give 17a-aza-D-homo-13-iso-1,3,5(10)-estratriene-3,17a-diol-17-one 3-methylether 17a-benzoate, M.P. 190–195° C.

EXAMPLE 22

*17a-Aza-D-Homo-13-Iso-1,3,5(10)-Estratriene-3,17a-Diol-17-One 3,17a-Dimethylether*

To a stirred solution of 1 g. of 17a-aza-D-homo-13-iso-1,3,5(10)-estratriene-3,17a-diol-17-one 3-methylether (the compound of Example 13A) in 100 ml. of ether is added a large molar excess of ethereal diazomethane followed by 0.1 ml. of boron trifluoride etherate. The solution is allowed to stand for 18 hours at room temperature and is then concentrated in vacuo to a residue which is crystallized from acetone-hexane to give 17a-aza-D-homo-13-iso-1,3,5(10)-estratriene-3,17a-diol-17-one 3,17a-dimethylether.

In a similar manner, 17a-aza-D-homo-1,3,5(10)-estratriene-3,17a-diol-17-one 3-methylether (the compound of Example 13B) is reacted with diazomethane to give 17a-aza-D-homo-1,3,5(10)-estratriene-3,17a-diol-17-one 3,17a-dimethylether.

EXAMPLE 23

*17a-Aza-D-Homo-13-Iso-1,3,5(10)-Estratriene-3,17a-Diol-17-One 3-Methylether 17a-n-Propylether*

To a solution of 500 mg. of 17a-aza-D-homo-13-iso-1,3,5(10)-estratriene-3,17a-diol-17-one 3-methylether (the compound of Example 13A) in 10 ml. of refluxing ethanol is added 0.45 ml. of n-propyl iodide and 2.5 ml. of 10% aqueous potassium hydroxide solution. The mixture is refluxed for 5 hours and then concentrated in vacuo to a residue. Water is added to the residue and a solid separates which is filtered, washed with water, air-dried and crystallized from acetone-hexane to give 17a-aza-D-homo-13-iso-1,3,5(10)-estratriene-3,17a-diol-17-one 3-methylether 17a-n-propylether.

Similarly, 17a-aza-D-homo-1,3,5(10)-estratriene-3,17a-diol-17-one 3-methylether (the compound of Example 13B) is reacted with n-propyl iodide in the above-described manner to give 17a-aza-D-homo-1,3,5(10)-estratriene-3,17a-diol-17-one 3-methylether 17a-n-propylether.

EXAMPLE 24

*17a-Aza-D-Homo-13-Iso-1,3,5(10)-Estratriene-3-Ol-17-One 3-Methylether*

A solution of 90 mg. of 17a-aza-D-homo-13-iso-1,3,5(10)-estratriene-3,17a-diol-17-one 3-methylether (the compound of Example 13A) in 9 ml. of ethylene glycol and 0.27 ml. of 95% hydrazine is refluxed for four hours. The reaction mixture is cooled and poured into dilute aqueous hydrochloric acid and ice. A solid separates which is filtered, washed with water, dried and crystallized from methanol-ethylacetate to give 17a-aza-D-homo-13-iso-1,3,5(10)-estratriene-3-ol-17-one 3-methylether, M.P. 225–228° C., $[\alpha]_D$ —1°.

In a similar manner, 17a-aza-D-homo-1,3,5(10)-estratriene-3,17a-diol-17-one 3-methylether (the compound of Example 13B) is reacted with hydrazine in ethylene glycol to give 17a-aza-D-homo-1,3,5(10)-estratriene-3-ol-17-one 3-methylether.

EXAMPLE 25

*17a-Aza-D-Homo-13-Iso-1,3,5(10)-Estratriene-3-Ol-17-One 3-Benzoate*

17a-aza-D-homo-13-iso-1,3,5(10)-estratriene-3,17a-diol-17-one 3-benzoate (the compound of Example 10B) is reacted with 95% hydrazine in ethylene glycol in the manner of Example 24. The resultant product is isolated and purified in the described manner to give 17a-aza-D-homo-13-iso-1,3,5(10)-estratriene13-ol-17-one 3-benzoate, M.P. 265–270° C., $[\alpha]_D$+19°, (chloroform).

In a similar manner, 17a-aza-D-homo-1,3,5(10)-estratriene-3,17a-diol-17-one 3-benzoate (the compound of Example 10C) is reacted with hydrazine in ethylene glycol to give 17a-aza-D-homo-1,3,5(10)-estratriene-3,ol-17-one 3-benzoate.

EXAMPLE 26

*17a-Aza-D-Homo-5α-13-Isoandrostane-3α-ol-17-One 3-Acetate*

To a stirred solution of 50 mg. of 17a-aza-D-homo-5α-13-isoandrostane-3α-17a-diol-17-one 3-acetate (the compound of Example 1C) in 10 ml. of glacial acetic acid is added 250 mg. of zinc powder. The reaction mixture is refluxed and stirred for 4 hours, then filtered while hot, the residue on the filtrate being washed with a little hot acetic acid. The filtrate and washings are combined, poured into ice water and the resultant aqueous mixture extracted with methylene chloride. The methylene chloride extracts are combined, washed with 10% aqueous sodium bicarbonate solution, then water, dried over sodium sulfate and concentrated in vacuo to a residue. The residue is triturated with ether, filtered and crystallized from acetone-ether to give 17a-aza-D-homo-5α-13-isoandrostane-3α-ol-17-one 3-acetate.

In the manner described above, 17a-aza-D-homo-5α-androstane-3α-17a-diol-17-one 3-acetate (the compound of Example 1B) is reacted with zinc in glacial acetic acid to give 17a-aza-D-homo-5α-androstane-3α-ol-17-one 3-acetate, M.P. 282–284° C.

EXAMPLE 27

*17a-Aza-D-Homo-13-Iso-4-Androstene-3,17-Dione*

17a-aza-D-homo-13-iso-4-androstene-17a-ol-3,17-dione (the compound of Example 2C) is reacted with zinc in glacial acetic acid in the manner similar to that described in Example 26. The resultant product is isolated in the described manner and crystallized from ethyl acetate-methanol to give 17a-aza-D-homo-13-iso-4-androstene-3,17-dione.

Similarly, 17a-aza-D-homo-4-androstene-17a-ol-3,17-dione (the compound of Example 2B) is reacted with zinc in glacial acetic acid. The resultant product isolated and purified to give 17a-aza-D-homo-4-androstene-3,17-dione, M.P. 258–260° C.

EXAMPLE 28

*17a-Aza-D-Homo-5α-13-Isoandrostane-3α-Ol-17-One*

100 mg. of 17a-aza-D-homo-5α-13-isoandrostane-3α-ol-17-one 3-acetate (the compound of Example 26) is dissolved in 15 ml. of refluxing 5% methanolic potassium hydroxide solution. The solution is refluxed for one hour then concentrated in vacuo to a residue containing a small amount of methanol. The residue is triturated with water, filtered, washed with water and dried to give 17a-aza-D-homo-5α-13-isoandrostane-3α-ol-17-one.

Alternatively, the compound of this example is prepared by reacting 17a-aza-D-homo-5α-13-isoandrostane-3α,17a-diol-17-one 3-acetate (the compound of Example 1C) with hydrazine in ethylene glycol in the manner described in Example 24.

EXAMPLE 29

*17a-Aza-D-Homo-5α-Androstane-3α,17a-Diol-17-One 17a-Methylether*

17a-aza-D-homo-5α-androstane-3α,17a-diol-17-one 3-acetate 17a-methylether (prepared as described in Example 8) is reacted with 5% methanolic potassium hydroxide in the manner of Example 6. The resultant product is isolated in the manner described to give 17a-aza-D-homo-5α-androstane-3α,17a-diol-17-one 17a-methylether.

In a similar manner, 17a-aza-D-homo-5α-13-isoandrostane-3α,17a-diol-17-one 3-acetate 17a-methylether (prepared as described in Example 8) is reacted with methanolic potassium hydroxide to give 17a-aza-D-homo-5α-13-isoandrostane-3α-17a-diol-17-one 17a-methylether.

EXAMPLE 30

*17a-Aza-D-Homo-13-Iso-1,3,5(10)-Estratriene-3,17a-Diol-17-One-3-Benzoate 17a-Methylether*

17a-aza-D-homo-13-iso-1,3,5(10)-estratriene-3,17a-diol-17-one 3-benzoate (the compound of Example 10B) in ether is reacted with a molar excess ethereal diazomethane in the presence of boron trifluoride etherate in the manner described in Example 22. The resultant product is isolated and purified to give 17a-aza-D-homo-13-iso-1,3,5(10)-estratriene-3,17a-diol-17-one 3-benzoate 17a-methylether.

In a similar manner, 17a-aza-D-homo-1,3,5(10)-estratriene-3,17a-diol-17-one 3-benzoate (the compound of Example 10C) is reacted with diazomethane and the resultant product isolated and purified to give 17a-aza-D-homo-1,3,5(10)-estratriene-3,17a-diol-17-one 3-benzoate 17a-methylether.

EXAMPLE 31

*17a-Aza-D-Homo-13-Iso-1,3,5(10)-Estratriene-3,17a-Diol-17-One 17a-Methylether*

17a-aza-D-homo-13-iso-1,3,5(10)-estratriene-3,17a-diol-17-one 3-benzoate 17a-methylether (the compound of Example 30) is reacted with 5% methanolic potassium hydroxide in the manner described in Example 6 and the resultant product isolated and purified to give 17a-aza-D-homo-13-iso-1,3,5(10)-estratriene-3,17a-diol-17-one 17a-methylether.

Similarly, 17a-aza-D-homo-1,3,5(10)-estratriene-3,17a-diol-17-one 3-benzoate 17a-methylether (prepared as described in Example 30) is reacted with methanolic potassium hydroxide to give 17a-aza-D-homo-1,3,5(10)-estratriene-3,17a-diol-17one 17a-methylether.

EXAMPLE 32

*17a-Aza-D-Homo-13-Iso-1,3,5(10)-Estratriene-3,17a-Diol-17-One 3-Propionate 17a-Methylether*

17a-aza-D-homo-13-iso-1,3,5(10)-estratriene-3,17a-diol-17-one 17a-methylether (the compound of Example 31) is reacted with propionic anhydride and pyridine in a manner similar to that described in Example 18. The resultant product is isolated and purified in the described manner to give 17a-aza-D-homo-13-iso-1,3,5(10)-estratriene-3,17a-diol-17-one 3-propionate 17a-methylether.

In a similar manner 17a-aza-D-homo-1,3,5(10)-estratriene-3,17a-diol-17-one 17a-methylether (prepared as described in Example 31) is reacted with propionic anhydride and pyridine to give 17a-aza-D-homo-1,3,5(10)-estratriene-3,17a-diol-17-one 3-propionate 17a-methylether.

EXAMPLE 33

*17a-Aza-D-Homo-5α-Androstane-3α,17aDiol-17-One 3-Benzoate 17a-Methylether*

17a-aza-D-homo-5α-androstane-3α,17a-diol-17-one 17a-methylether (the compound of Example 29) is reacted with benzoyl chloride and pyridine in the manner of Example 19. The resultant product is isolated and purified as described to give 17a-aza-D-homo-5α-androstane-3α,17a-diol-17-one 3-benzoate 17a-methylether.

In a similar manner 17a-aza-D-homo-5α-13-isoandrostane-3α,17a-diod-17-one 17a-methylether is reacted with benzoyl chloride and pyridine to give 17a-aza-D-homo-5α-13-isoandrostane-3α,17a-diol-17-one 3-benzoate 17a-methylether.

I claim:

1. A D-homo-steroid of the group consisting of:
   3X-17-keto-17a-aza-D-homo-1,3,5(10)-estratriene,
   3X-17-keto-17a-aza-D-homo-1,3,5(10)-iso-estratriene,
   3Y-17-keto-17a-aza-D-homo-5α-androstane,
   3Y-17-keto-17a-aza-D-homo-5α-iso-androstane,
   3,17-diketo-17a-aza-D-homo-4-androstene,
   3,17-diketo-17a-aza-D-homo-4-iso-androstene,
   3,17-diketo-17a-aza-D-homo-19-nor-4-androstene, and
   3,17-diketo-17a-aza-D-homo-19-nor-4-iso-androstene,
   where X is a member of the group consisting of hydroxy, lower alkoxy, and an acyloxy radical of a hydrocarbon carboxylic acid having up to eight carbon atoms; and Y is a member of the group consisting of hydroxy and an acyloxy radical of a hydrocarbon carboxylic acid having up to eight carbon atoms;
   said D-homo-steroid having attached to the 17a-nitrogen atom a substituent of the group consisting of hydroxy, lower alkoxy, lower alkanoyloxy, p-tolenesulfonyloxy, and methanesulfonyloxy.

2. 17a-aza-D-homo-13-iso-1,3,5(10)-estratriene-3,17a-diol-17-one.

3. 17a-aza-D-homo-1,3,5(10)-estratriene-3,17a-diol-17-one.

4. 3-OR-17a-OW-17a-aza-D-homo-13-iso-1,3,5(10)-estratriene-17-one wherein R and W are acyl radicals of a hydrocarbon carboxylic acid having up to eight carbon atoms.

5. 3-OW-17a-aza-D-homo-13-iso-1,3,5(10)-estratriene-17a-ol-17-one wherein W is an acyl radical of a hydrocarbon carboxylic acid having up to eight carbon atoms.

6. 3-OW-17a-aza-D-homo-1,3,5(10)-estratriene-17a-ol-17-one wherein W is an acyl radical of a hydrocarbon carboxylic acid having up to eight carbon atoms.

7. 3-loweralkoxy-17a-aza-D-homo-1,3,5(10)-estratriene-17a-ol-17-one.

8. 3-loweralkoxy-17-aza-D-homo-13-iso-1,3,5(10)-estratriene-17a-ol-17-one.

9. 17a-OW-3-loweralkoxy-17a-aza-D-homo-13-iso-1,3,5(10)-estratriene-17-one wherein W is an acyl radical of a hydrocarbon carboxylic acid having up to eight carbon atoms.

10. 17a-OW-3-loweralkoxy-17a-aza-D-homo-1,3,5(10)-estratriene-17-one wherein W is an acyl radical of a hydrocarbon carboxylic acid having up to eight carbon atoms.

11. 17a-OW-3-loweralkoxy-17a-aza-D-homo-13-iso-1,3,5(10)-estratriene-17-one wherein W is an acyl radical of a sulfonic acid selected from the group consisting of p-toluene sulfonic acid and methane sulfonic acid.

12. 17a-OW-3-loweralkoxy-17a-aza-D-homo-1,3,5(10)-estratriene-17-one wherein W is an acyl radical of a sulfonic acid selected from the group consisting of p-toluene sulfonic acid and methane sulfonic acid.

13. 17a-aza-D-homo-5α-androstane-3α,17a-diol-17-one.

14. 17a-aza-D-homo-13-iso-1,3,5(10)-estratriene-3,17a-diol-17-one 3-benzoate 17a-acetate.

15. 17a-aza-D-homo-13-iso-1,3,5(10)-estratriene-3,17a-diol-17-one 3-benzoate.

16. 17a aza-D-homo-1,3,5(10)-estratriene-3,17a-diol-17-one 3-benzoate.

17. 17a-aza-D-homo-13-iso-1,3,5(10)-estratriene-3,17a-diol-17-one 3 methylether.

18. 17a-aza-D-homo-1,3,5(10)-estratriene-3,17a-diol-17-one 3-methylether.

19. 17a-aza-D-homo-13-iso-1,3,5(10)-estratriene-3,17a-diol-17-one 3-methylether 17a-acetate.

20. 17a-aza-D-homo-4-androstene-17a-ol-3,17-dione.

21. 17a-aza-D-homo-4-androstene-17a-ol-3,17-dione 17a-acetate.

22. 17a-aza-D-homo-19-nor-4-androstene-17a-ol-3,17-dione.

23. A compound selected from the group consisting of 3-OR-1,3,5(10)-estratriene-17β-ol 17 nitrite, 3-OR-1,3,5-(10)-estratriene-17α-ol 17-nitrite, 3α-OR'-5α-androstane-17β-ol 17-nitrite, 4-androstene-17β-ol-3-one 17-nitrite and 19-nor-4-androstene-17β-ol-3-one 17-nitrite wherein R is a member of the group consisting of H, lower alkyl, and an acyl radical of a hydrocarbon carboxylic acid having up to eight carbon atoms, and R' is a member of the group consisting of H and an acyl radical of a hydrocarbon carboxylic acid having up to eight carbon atoms.

24. In the process of preparing a steroid of the group consisting of a 17a-aza-D-homo-17a-hydroxy-17-keto-androstane, a 17a-aza-D-homo-17a-hydroxy-13-isoandrostane, a 17a-aza-D-homo-17a-hydroxyestrane, and a 17a-aza-D-homo-17a-hydroxy-13-isoestrane, the step which comprises irradiating a 17-nitrite ester of a steroid of the group consisting of a 16-desoxy-17-hydroxyandrostane, a 16-desoxy-17-hydroxy-13-isoandrostane, a 16-desoxy-17-hydroxyestrane, and a 16-desoxy-17-hydroxy-13-isoestrane in a non-polar solvent with ultra-violet radiation, said radiation including an absorption band of the nitrite radical.

25. In the process of preparing a 17a-aza-D-homo-17a-hydroxy-17-keto steroid of the group consisting of the estrane and androstane series, the steps which comprise reacting a 16-desoxy-17-hydroxy steroid of the group consisting of the androstane and estrane series with a nitrosyl halide; and irradiating the 16-desoxy-17-nitrite ester thereby produced in a non-polar solvent with ultra-violet irradiation, said radiation including an absorption band of the nitrite radical.

References Cited in the file of this patent

UNITED STATES PATENTS

| | | |
|---|---|---|
| 2,738,350 | Mazur | Mar. 13, 1956 |
| 2,889,355 | Ruzucka et al. | June 2, 1959 |
| 2,897,202 | Wildi | July 28, 1959 |